(12) United States Patent
Hashimoto et al.

(10) Patent No.: US 10,311,653 B2
(45) Date of Patent: Jun. 4, 2019

(54) HYBRID VEHICLE

(71) Applicant: TOYOTA JIDOSHA KABUSHIKI KAISHA, Toyota-shi, Aichi-ken (JP)

(72) Inventors: Keita Hashimoto, Toyota (JP); Ryuta Ishida, Okazaki (JP); Hiroaki Takeuchi, Toyota (JP); Hiroaki Arakawa, Nagakute (JP); Shinji Ichikawa, Toyota (JP); Shigeki Kinomura, Toyota (JP); Akio Uotani, Toyota (JP); Kazuyuki Kagawa, Toyota (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/465,831

(22) Filed: Mar. 22, 2017

(65) Prior Publication Data

US 2017/0287234 A1    Oct. 5, 2017

(30) Foreign Application Priority Data

Mar. 30, 2016   (JP) ................................. 2016-069247

(51) Int. Cl.
*B60K 6/26* (2007.10)
*B60K 6/28* (2007.10)
(Continued)

(52) U.S. Cl.
CPC ................ *G07C 5/008* (2013.01); *B60K 6/46* (2013.01); *B60K 35/00* (2013.01);
(Continued)

(58) Field of Classification Search
CPC ......... G07C 5/008; G07C 5/08; B60W 20/00; B60W 20/15; B60W 2530/14;
(Continued)

(56) References Cited

U.S. PATENT DOCUMENTS 8,725,551 B2 *   5/2014   Ambrosio .............. G06Q 30/02
                                                                705/7.31
8,812,224 B1     8/2014   Heitmann
                          (Continued)

FOREIGN PATENT DOCUMENTS

DE      102011122182 A1   6/2012
JP           8-19114      1/1996
                          (Continued)

OTHER PUBLICATIONS

Office Action issued in U.S. Appl. No. 15/469,688 dated Sep. 6, 2017.
(Continued)

*Primary Examiner* — Michael J Zanelli
(74) *Attorney, Agent, or Firm* — Finnegan, Henderson, Farabow, Garrett & Dunner, LLP

(57) ABSTRACT

A use index IDX indicative of a degree of use of external charging is calculated and transmitted to a vehicle external system. The vehicle external system provides a service or imposes a penalty based on the use index IDX. In a case where the degree of use of external charging is determined to be low based on the use index IDX, if the vehicle external system provides a non-preferential service or imposes a heavy penalty as compared with a case where the degree of use of external charging is determined to be high, a driver or an owner of a vehicle takes an action by which the use index is determined to indicate a high degree of use of external charging. As a result, the use of external charging can be promoted.

4 Claims, 4 Drawing Sheets

(51) Int. Cl.
*B60K 6/46* (2007.10)
*B60K 6/48* (2007.10)
*G07C 5/00* (2006.01)
*G07C 5/08* (2006.01)
*B60K 35/00* (2006.01)
*B60K 6/365* (2007.10)
*B60K 6/445* (2007.10)
*B60W 20/00* (2016.01)
*B60W 20/15* (2016.01)
*B60W 40/09* (2012.01)
*G01C 21/36* (2006.01)
*B60L 11/18* (2006.01)

(52) U.S. Cl.
CPC ....... *B60L 11/1818* (2013.01); *B60L 11/1848* (2013.01); *B60L 11/1861* (2013.01); *B60W 20/00* (2013.01); *B60W 20/15* (2016.01); *B60W 40/09* (2013.01); *G01C 21/3605* (2013.01); *G01C 21/3682* (2013.01); *G01C 21/3685* (2013.01); *G01C 21/3694* (2013.01); *G07C 5/08* (2013.01); *B60K 6/26* (2013.01); *B60K 6/28* (2013.01); *B60K 6/365* (2013.01); *B60K 6/445* (2013.01); *B60K 6/48* (2013.01); *B60K 2006/4825* (2013.01); *B60K 2350/106* (2013.01); *B60K 2350/1028* (2013.01); *B60K 2350/1096* (2013.01); *B60L 11/1803* (2013.01); *B60L 2220/14* (2013.01); *B60L 2220/42* (2013.01); *B60L 2240/622* (2013.01); *B60L 2240/642* (2013.01); *B60L 2240/68* (2013.01); *B60L 2250/16* (2013.01); *B60L 2270/10* (2013.01); *B60W 2530/14* (2013.01); *B60W 2550/40* (2013.01); *B60W 2750/40* (2013.01); *B60Y 2200/92* (2013.01); *G01C 21/3664* (2013.01); *Y02T 10/6221* (2013.01); *Y02T 10/6239* (2013.01); *Y02T 10/6252* (2013.01); *Y02T 10/6269* (2013.01); *Y10S 903/905* (2013.01); *Y10S 903/906* (2013.01); *Y10S 903/907* (2013.01); *Y10S 903/91* (2013.01)

(58) Field of Classification Search
CPC ............ B60W 2550/40; B60L 11/1818; B60L 11/1861; B60L 2270/10; Y02T 10/6269; B60Y 2200/92
See application file for complete search history.

(56) References Cited

U.S. PATENT DOCUMENTS

| | | |
|---|---|---|
| 2009/0144149 A1 | 6/2009 | Sakakibara et al. |
| 2009/0242288 A1 | 10/2009 | Oyobe et al. |
| 2010/0168944 A1* | 7/2010 | Otake ................. B60K 6/26 701/22 |
| 2010/0217468 A1* | 8/2010 | Soma ................. B60K 6/365 701/22 |
| 2010/0280692 A1 | 11/2010 | Eckhoff et al. |
| 2010/0280885 A1 | 11/2010 | Eckhoff et al. |
| 2011/0043355 A1 | 2/2011 | Chander et al. |
| 2012/0007553 A1 | 1/2012 | Ichikawa et al. |
| 2012/0242466 A1 | 9/2012 | Stillfried et al. |
| 2012/0280804 A1 | 11/2012 | Matsumoto et al. |

FOREIGN PATENT DOCUMENTS

| | | |
|---|---|---|
| JP | 2007-068358 A | 3/2007 |
| JP | 2009-023563 A | 2/2009 |
| JP | 2009-134450 A | 6/2009 |
| JP | 2009-214668 A | 9/2009 |

OTHER PUBLICATIONS

Notice of Allowance issued in U.S. Appl. No. 15/469,688 dated Jan. 26, 2018.
Corrected Notice of Allowability issued in U.S. Appl. No. 15/469,688 dated Apr. 24, 2018.
Office Action issued in U.S. Appl. No. 15/961,593 dated Jun. 1, 2018.
U.S. Appl. No. 15/961,593, filed Apr. 24, 2018.
Final Office Action issued in U.S. Appl. No. 15/469,688 dated Oct. 29, 2018.
Final Office Action issued in U.S. Appl. No. 15/961,593 dated Oct. 19, 2018.
Notice of Allowance issued in U.S. Appl. No. 15/961,593 dated Feb. 21, 2019.
Notice of Allowance issued in U.S. Appl. No. 15/469,688 dated Feb. 13, 2019.

* cited by examiner

HYBRID VEHICLE

INCORPORATION BY REFERENCE

The disclosure of Japanese Patent Application No. 2016-069247 filed on Mar. 30, 2016 including the specification, drawings and abstract is incorporated herein by reference in its entirety.

BACKGROUND

1. Technical Field

The disclosure relates to a hybrid vehicle and more specifically relates to a hybrid vehicle that is configured such that charging of a battery and refueling of a fuel tank are carried out.

2. Description of Related Art

Conventionally, as this type of hybrid vehicle, there has been proposed one in which at least one of the output of an electric motor and the output of an internal combustion engine is limited when the change in parameter that depends on the quantity of fuel use by the internal combustion engine after external charging of a battery has reached a predetermined value (see, e.g., Japanese Patent Application Publication No. 8-19114 (JP 8-19114 A)). With this hybrid vehicle, a driver is urged to carry out external charging of the battery by the limitation of at least one of the output of the electric motor and the output of the internal combustion engine when the change in parameter has reached the predetermined value, thereby facilitating the travel of the vehicle not relying on the internal combustion engine. Consequently, the effect of suppressing air pollution, which is the primary purpose of an electric vehicle, can be sufficiently obtained while leaving a margin such that the vehicle can travel by the internal combustion engine in an emergency.

With the hybrid vehicle described above, however, only by limiting at least one of the output of the electric motor and the output of the internal combustion engine, there are those instances where the effect of urging the use of external charging is insufficient. For example, for a driver who always drives the vehicle to travel with relatively low power, the output limitation of the electric motor or the internal combustion engine has no meaning at all.

SUMMARY

A hybrid vehicle in the present aspect includes: an engine; a fuel tank configured to supply fuel to the engine; a motor; a battery configured to supply electric power to the motor; a charger configured to carry out external charging that charges the battery by use of an external power source; and a communication device configured to transmit, to a vehicle external system, a use index indicative of a degree of use of external charging in a predetermined time period.

In the hybrid vehicle of the aspect, the use index indicative of the degree of use of external charging in the predetermined time period is transmitted to the vehicle external system. The vehicle external system provides various services or imposes various penalties based on the use index thus received. In a case where the degree of use of external charging is determined to be low based on the use index, if the vehicle external system provides a non-preferential service or imposes a heavy penalty as compared with a case where the use index is high, a driver or an owner of the vehicle takes an action by which the use index is determined to indicate a high degree of use of external charging. As a result, the use of external charging can be promoted. Here, as the "predetermined time period," it is possible to use a time period set in advance in terms of time, such as one month or two months, a time period determined in advance in terms of occasion, such as a period during 20 trips or a period during 30 trips, or the like.

Note that the service to be provided or the penalty to be imposed by the vehicle external system may be setting of a high toll or a low toll in a toll road, permission of use of a priority lane or a special-purpose lane on a road including a plurality of lanes, permission of entry to a parking lot or the like, permission of use of a priority parking space or a special-purpose parking space in a parking lot, setting of a high battery charging fee or a low battery charging fee at a battery charging station, and the like.

The communication device (communication means) may be configured to transmit the use index when the communication device receives a communication request from the vehicle external system. With this configuration, the use index may be transmitted only when the communication request is transmitted from the vehicle external system.

The "use index" indicates a degree of use of external charging in a predetermined time period, and the present specification uses an index indicative of such a relationship that, the greater the use index, the better the use of external charging. For example, any of the following i) to xiv) can be used as the use index as it is, or an index obtained by calculation based on any one or a plurality of the following i) to xiv) can be used as the use index: i) a ratio of the number of times of charging to the number of trips (the number of times of charging/the number of trips); ii) a ratio of a total time for which the charger is connected to the external power source to a total time for which the vehicle is stopped with system off (total charger connecting time/total vehicle stop time); iii) ratio of a total distance of EV travel to a total distance of HV travel (total EV-travel distance/total HV-travel distance); iv) a ratio of a total time of EV travel to a total time of HV travel (total EV-travel time/total HV-travel time); v) a ratio of the total distance of EV travel to a total travel distance (total Mir-travel distance/total travel distance); vi) a ratio of the total time of EN travel to a total travel time (total EV-travel time/total travel time); vii) a ratio of a total charging amount of charging of the battery by the charger to a total supply quantity to the fuel tank (total charging amount/total refueled quantity); viii) a ratio of an integrated value of an energy charged to the battery by electric power from the external power source to an integrated value of an energy consumed by travel (integrated externally-charged energy value/integrated travel-consumed energy value); ix) a ratio of an integrated value of an energy consumed by EV travel to an integrated value of an energy consumed by HV travel (integrated EV-travel energy value/integrated HV-travel energy value); x) a total time for which the charger is connected to the external power source (total charger connecting time); xi) a total charging amount of charging of the battery by the charger; xii) a ratio of a traveled total travel distance to a total discharge amount of carbon dioxide (total travel distance/total carbon dioxide discharge amount); xiii) a ratio of the number of times that the external charging has been carried out in charging chances in which the vehicle is in a state where the external charging is able to be carried out (the number of times of charging in chance) to the number of the charging chances (the number of chances) (the number of times of charging in chance/the number of chances); and xiv) an inverse number of a quantity of fuel use by an internal combustion engine after external charging (1/quantity of fuel use after external charging).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, modes for carrying out the embodiment will be described with reference to embodiments.

Figure 1:
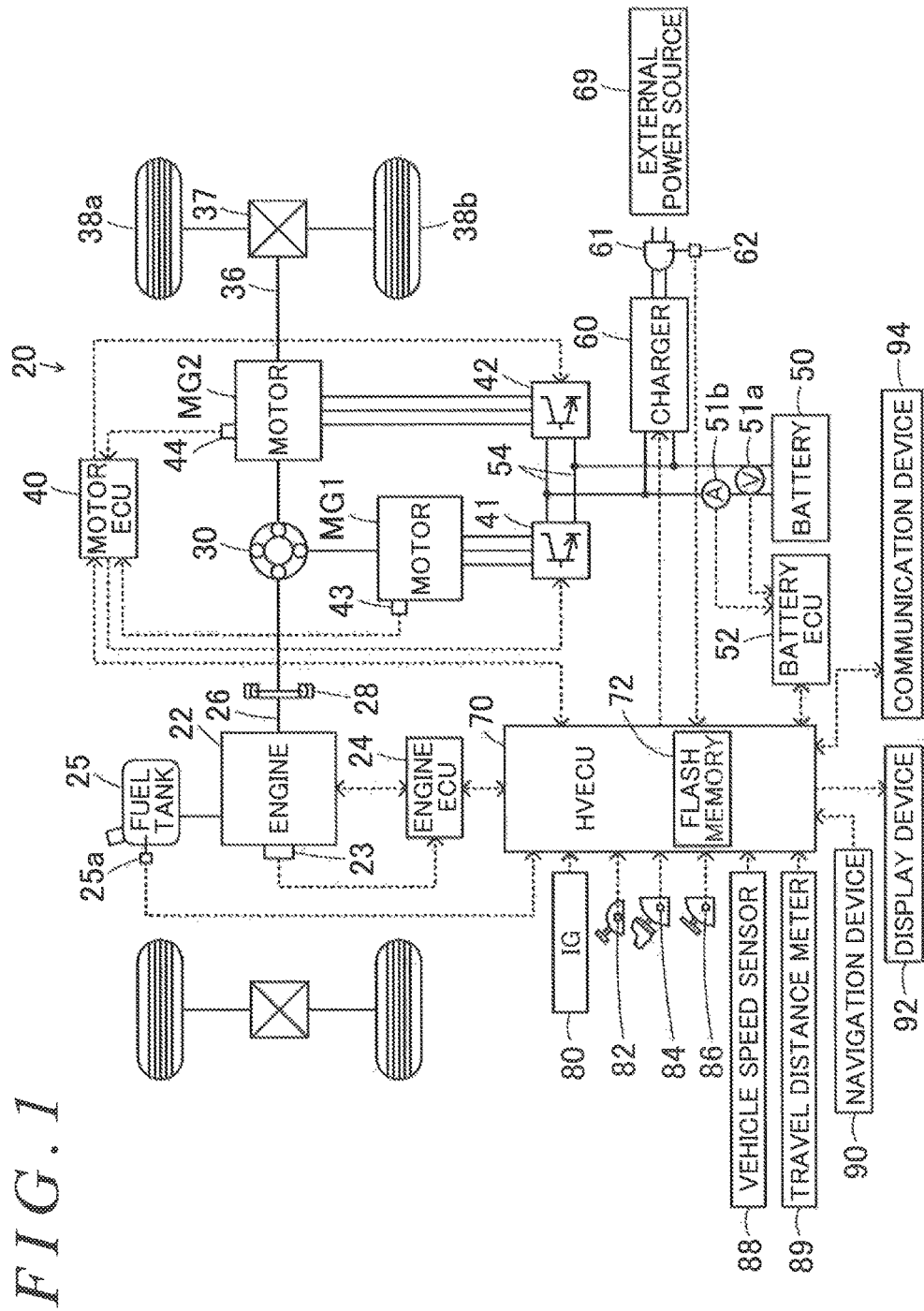
FIG. 1 is a configuration diagram schematically illustrating a configuration of a hybrid vehicle according to an embodiment of the disclosure.

FIG. 1 is a configuration diagram schematically illustrating a configuration of a hybrid vehicle 20 according to an embodiment of the disclosure. As illustrated herein, the hybrid vehicle 20 of the embodiment includes an engine 22, a planetary gear 30, motors MG1 and MG2, inverters 41 and 42, a battery 50, a charger 60, a navigation device 90, a display device 92, a communication device 94, and a hybrid electronic control unit (hereinafter referred to as an "HVECU") 70.

The engine 22 is configured as an internal combustion engine that uses fuel such as gasoline or diesel fuel from a fuel tank 25 to output power. The operation of the engine 22 is controlled by an engine electronic control unit (hereinafter referred to as an "engine ECU") 24.

Although not shown, the engine ECU 24 is configured as a microprocessor including a CPU as its main component and, in addition to the CPU, includes a ROM that stores processing programs, a RAM that temporarily stores data, input and output ports, and a communication port. Signals from various sensors that are necessary for controlling the operation of the engine 22, such as, for example, a crank angle θcr from a crank position sensor 23 that detects a rotational position of a crankshaft 26 of the engine 22, are input to the engine ECU 24 via the input port. Various control signals for controlling the operation of the engine 22 are output from the engine ECU 24 via the output port. The engine ECU 24 is connected to the HVECU 70 via the communication port. The engine ECU 24 calculates a rotational speed Ne of the engine 22 based on the crank angle θcr from the crank position sensor 23.

The planetary gear 30 is configured as a single-pinion type planetary gear mechanism. A rotor of the motor MG1 is connected to a sun gear of the planetary gear 30. A drive shaft 36 coupled to drive wheels 38a and 38b via a differential gear 37 is connected to a ring gear of the planetary gear 30. The crankshaft 26 of the engine 22 is connected to a carrier of the planetary gear 30 via a damper 28.

The motor MG1 is configured as, for example, a synchronous generator motor, and as described above, the rotor of the motor MG1 is connected to the sun gear of the planetary gear 30. The motor MG2 is configured as, for example, a synchronous generator motor, and a rotor of the motor MG2 is connected to the drive shaft 36. The inverters 41 and 42 are connected to the battery 50 via electric power line 54. The motors MG1 and MG2 are rotationally driven by the inverters 41 and 42, respectively, when a plurality of switching elements (not shown) of the inverters 41 and 42 are switching-controlled by a motor electronic control unit (hereinafter referred to as a "motor ECU") 40.

Although not shown, the motor ECU 40 is configured as a microprocessor including a CPU as its main component and, in addition to the CPU, includes a ROM that stores processing programs, a RAM that temporarily stores data, input and output ports, and a communication port. Signals from various sensors that are necessary for drivingly controlling the motors MG1 and MG2, such as, for example, rotational positions θm1 and θm2 from rotational position detection sensors 43 and 44 that respectively detect rotational positions of the rotors of the motors MG1 and MG2, are input to the motor ECU 40 via the input port. Switching control signals for the plurality of switching elements (not shown) of the inverters 41 and 42 and so on are output from the motor ECU 40 via the output port. The motor ECU 40 is connected to the HVECU 70 via the communication port. The motor ECU 40 calculates rotational speeds Nm1 and Nm2 of the motors MG1 and MG2 based on the rotational positions θm1 and θm2 of the rotors of the motors MG1 and MG2 from the rotational position detection sensors 43 and 44.

The battery 50 is configured as, for example, a lithium-ion secondary battery or a nickel-hydrogen secondary battery. As described above, the battery 50 is connected to the inverters 41 and 42 via the electric power line 54. The battery 50 is managed by a battery electronic control unit (hereinafter referred to as a "battery ECU") 52.

Although not shown, the battery ECU 52 is configured as a microprocessor including a CPU as its main component and, in addition to the CPU, includes a ROM that stores processing programs, a RAM that temporarily stores data, input and output ports, and a communication port. Signals from various sensors that are necessary for managing the battery 50, such as, for example, a battery voltage Vb from a voltage sensor 51a disposed between terminals of the battery 50 and a battery current Ib from a current sensor 51b attached to the output terminal of the battery 50, are input to the battery ECU 52 via the input port. The battery ECU 52 is connected to the HVECU 70 via the communication port. The battery ECU 52 calculates a state of charge SOC based on an integrated value of the battery current Ib from the current sensor 51b. The state of charge SOC is a ratio of the capacity of electric power, which can be discharged from the battery 50, to the full capacity of the battery 50.

The charger 60 is connected to the electric power line 54 and configured such that when a power plug 61 is connected to an external power source 69 such as a household power source or an industrial power source at a battery charging point such as at home or in a battery charging station, it is possible to carry out external charging that charges the battery 50 using electric power from the external power source 69.

The navigation device 90 includes a body incorporating a control unit having a storage medium such as a hard disk that stores map information and so on, input and output ports, a communication port, and so on, a GPS antenna that receives information on the current position of the vehicle, and a touch-panel display that displays various information such as information on the current position of the vehicle and a travel route to a destination and that allows an operator to input various instructions. Herein, as the map information, service information (e.g., sightseeing information, parking lots, battery charging stations, etc.), road information per travel section determined in advance (e.g., between traffic lights, between intersections, etc.), and so on are stored in a database. The road information includes distance information, width information, area information (urban area, suburban area), type information (general road, expressway), gradient information, legal speed limit, the number of traffic lights, and so on. A parking lot at home and a desired spot can be point-registered as service information. When a destination is set by the operator, the navigation device 90 searches for a travel route from a current position of the vehicle to the destination based on the map information, the current position of the vehicle, and the destination and outputs the retrieved travel route to the display to perform route guidance. The navigation device 90 also calculates route information in the travel route (e.g., a remaining distance Ln to the destination, a direction Dn of the destination, etc.).

Although not shown, the HVECU 70 is configured as a microprocessor including a CPU as its main component and, in addition to the CPU, includes a ROM that stores processing programs, a RAM that temporarily stores data, a flash memory 72, input and output ports, and a communication port. Signals from various sensors are input to the HVECU 70 via the input port. As the signals that are input to the HVECU 70, there can be cited, for example, an ignition signal from an ignition switch 80, a shift position SE from a shift position sensor 82, an accelerator opening degree Acc from an accelerator pedal position sensor 84, and a brake pedal position BP from a brake pedal position sensor 86. There can further be cited a vehicle speed V from a vehicle speed sensor 88, a travel distance Lpre from a travel distance meter 89, and a fuel quantity Qf from a fuel gauge 25a attached to the fuel tank 25. Further, there can also be cited a connection signal SWC from a connection switch 62 that is attached to the power plug 61 and determines whether or not the power plug 61 is connected to the external power source 69, data from the navigation device 90, and so on. Various control signals are output from the HVECU 70 via the output port. As the control signals that are output from the HVECU 70, there can be cited, for example, a control signal to the charger 60, a display control signal to the display device 92 attached to an instrument panel in front of a driver's seat, and so on. The HVECU 70 transmits vehicle information to a vehicle external system and receives information from the vehicle external system via the communication device 94. As described above, the HVECU 70 is connected to the engine ECU 24, the motor ECU 40, and the battery ECU 52 via the communication port. When the fuel tank 25 is refueled, the HVECU 70 calculates a refueled quantity Qin based on a fuel quantity Qf from the fuel gauge 25a.

The hybrid vehicle 20 of the embodiment configured as described above performs hybrid travel (HV travel) or electric travel (EV travel) in a CD (Charge Depleting) mode or a CS (Charge Sustaining) mode. Herein, the CD mode is a mode that gives priority to the EV travel as compared to the CS mode. The HV travel is a mode of traveling with the operation of the engine 22. The EV travel is a mode of traveling without the operation of the engine 22.

In the embodiment, when the power plug 61 is connected to the external power source 69 while the vehicle is stopped with the system off (with the system stopped) at a battery charging point such as at home or in a battery charging station, the HVECU 70 controls the charger 60 to charge the battery 50 using electric power from the external power source 69. When the state of charge SOC of the battery 50 is greater than a threshold value Shv1 (e.g., 45%, 50%, or 55%) upon turning on the system (upon starting the system), the vehicle travels in the CD mode until the state of charge SOC of the battery 50 reaches a threshold value Shv2 (e.g., 25%, 30%, or 35%) or less, while, after the state of charge SOC of the battery 50 reaches the threshold value Shv2 or less, the vehicle travels in the CS mode until the system is turned off. On the other hand, when the state of charge SOC of the battery 50 is less than or equal to the threshold value Shv1 upon turning on the system, the vehicle travels in the CS mode until the system is turned off.

Figure 2:
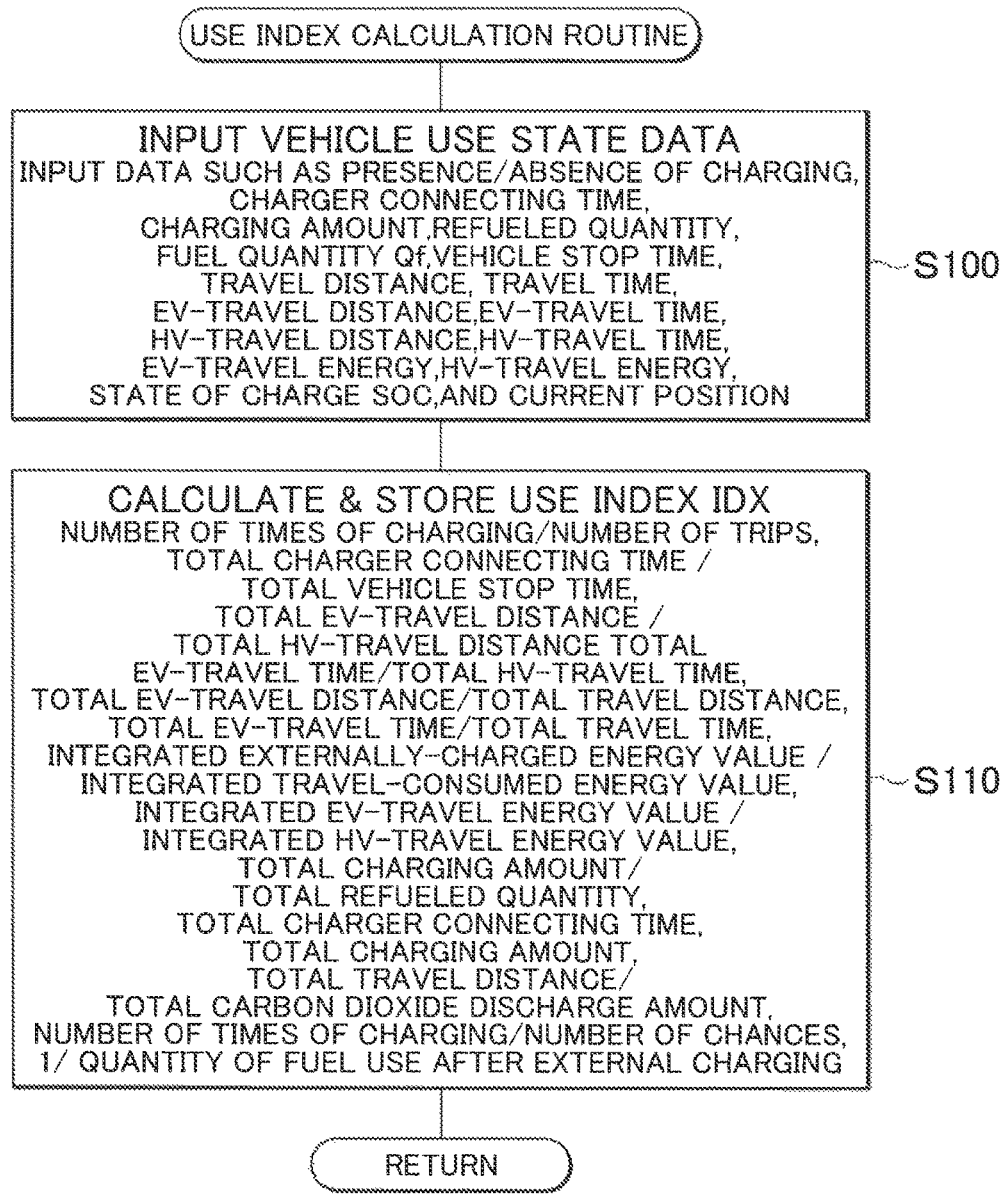
FIG. 2 is a flowchart illustrating an example of a use index calculation routine executed by an HVECU.

Next, a description will be given of the operation of the hybrid vehicle 20 of the embodiment thus configured, particularly the operation at the time when a use index IDX indicative of a degree of use of charging (external charging) of the battery 50 by the charger 60 is transmitted to the vehicle external system. First described is the use index IDX. FIG. 2 is a flowchart illustrating an example of a use index calculation routine. The routine is executed at a predetermined start timing, such as when the system is turned on (the system is started), when the system is turned off (the system is stopped), when charging of the battery 50 is completed by connecting the power plug 61 to the external power source 69, or when the fuel tank 25 is refueled. Hereinbelow, a description will be given assuming that this routine is executed when the system is turned on (the system is started).

When the use index calculation routine is executed, the HVECU 70 first performs a process of inputting data that reflect vehicle use states and are necessary for calculating a use index IDX in a predetermined time period (step S100). Herein, as a "predetermined time period," it is possible to use a time period that is determined in advance in terms of time, such as one month or two months, a time period that is determined in advance in terms of occasion, such as a period during 20 trips or a period during 30 trips, or the like. As "data that reflect vehicle use states," there can be cited, as data from the system-on timing of the last trip to the system-on timing of the current trip, the presence/absence of charging of the battery 50 by the charger 60 (the presence/absence of external charging), a charging time (a charger connecting time) for which the power plug 61 of the charger 60 is connected to the external power source 69, and a charging amount of the battery 50 by the charger 60. There can also be cited a refueled quantity, a fuel quantity Qf, a vehicle stop time from the system-off timing of the last trip to the system-on timing of the current trip, a travel distance in the last trip, and a travel time in the last trip. Further, there can be cited an EV-travel distance in the last trip, an EV-travel time in the last trip, an HV-travel distance in the last trip, and an HV-travel time in the last trip. Further, there can be cited an energy (an EV-travel energy) consumed by EV travel in the last trip, an energy (an HV-travel energy) consumed by HV travel in the last trip, a state of charge SOC, a current position of the vehicle, and so on.

After the data necessary for calculating the use index IDX are input as described above, the HVECU 70 calculates a use index IDX using the input data and stores the calculated use index IDX in the RAM (not shown) and the flash memory 72 of the HVECU 70 (step S110), and ends this routine. In the embodiment, the use index IDX is calculated as one of (1) to (14) given below or is calculated based on one or a plurality of (1) to (14). The use index IDX is calculated such that the greater the use index IDX, the better the use of charging (external charging) of the battery 50 by the charger 60.

(1) Ratio of Number of Times of Charging to Number of Trips (Number of Times of Charging/Number of Trips) The number of times of charging can be obtained by counting based on the presence/absence of external charging in the predetermined time period. The presence/absence of external charging can be detected by determining whether or not the power plug 61 is connected to the external power source 69 based on a connection signal SWC from the connection switch 62, or by determining an increase in the state of charge SOC of the battery 50. The number of trips can be obtained by counting every time the system is turned on in the predetermined time period. (2) Ratio of Total Time for which Charger 60 is connected to External Power Source 69 to Total Time for which Vehicle is stopped with System off (Total Charger Connecting Time/Total Vehicle Stop Time) The total charger connecting time can be obtained by integrating the charging time for which the power plug 61 of the charger 60 is connected to the external power source 69 in the predetermined time period. The total vehicle stop time can be obtained by integrating the vehicle stop time between the trips in the predetermined time period. (3) Ratio of Total Distance of EV Travel to Total Distance of HV Travel (Total EV-Travel Distance/Total HV-Travel Distance) The total EV-travel distance can be obtained by integrating the EV-travel distances in the trips in the predetermined time period. The total HV-travel distance can be obtained by integrating the HV-travel distances in the trips in the predetermined time period.

(4) Ratio of Total Time of EV Travel to Total Time of HV Travel (Total EV-Travel Time/Total HV-Travel Time) The total EV-travel time can be obtained by integrating the EV-travel time in the trips in the predetermined time period. The total HV-travel time can be obtained by integrating the HV-travel time in the trips in the predetermined time period. (5) Ratio of Total Distance of EV Travel to Total Travel Distance (Total EV-Travel Distance/Total Travel Distance) The total travel distance can be obtained by integrating the travel distances in the trips in the predetermined time period. (6) Ratio of Total Time of EV Travel to Total Travel Time (Total EV-Travel Time/Total Travel Time) The total travel time can be obtained by integrating the travel time in the trips in the predetermined time period.

(7) Ratio of Total Charging Amount of Charging of Battery 50 by Charger 60 to Total Refueled Quantity to Fuel Tank 25 (Total Charging Amount/Total Refueled Quantity) The total charging amount can be obtained by integrating the charging amounts by external charging in the predetermined time period. The total refueled quantity can be obtained by integrating the refueled quantities in the predetermined time period. (8) Ratio of integrated Value of Energy charged to Battery 50 by Electric Power from External Power Source 69 to Integrated Value of Energy consumed by Travel (Integrated Externally-Charged Energy Value/Integrated Travel-Consumed Energy Value) The integrated externally-charged energy value can be obtained by integrating the charging amounts in the predetermined time period. The integrated travel-consumed energy value can be obtained as an integrated value of EV-travel energy and HV-travel energy. The EV-travel energy or the HV-travel energy can be obtained by time-integrating the product of a vehicle weight M and a vehicle speed V ($\int M \cdot V dt$) during EV travel or HV travel. As the vehicle weight M, it is possible to use a value measured by a vehicle weight sensor, a value calculated based on data from a gradient sensor and the torque and acceleration of the motor MG2, or a value determined in advance. (9) Ratio of Integrated Value of Energy consumed by EV Travel to Integrated Value of Energy consumed by HV travel (Integrated EV-Travel Energy Value/Integrated HV-Travel Energy Value) The integrated EV travel energy value can be obtained by integrating the EV-travel energy. The integrated HV-travel energy value can be obtained by integrating the HV-travel energy.

(10) Total Time for which Charger 60 is connected to External Power Source 69 (Total Charger Connecting Time) The total charger connecting time can be obtained by integrating the time for which the charger 60 is connected to the external power source 69 in the predetermined time period. (11) Total Charging Amount of Charging of Battery SO by Charger 60 The total charging amount can be obtained by integrating the charging amounts by external charging in the predetermined time period. (12) Ratio of Traveled Total Travel Distance to Total Discharge Amount of Carbon Dioxide (Total Travel Distance/Total Carbon Dioxide Discharge Amount) The total carbon dioxide discharge amount can be calculated as the sum of the product of the total refueled quantity and a fuel coefficient and the product of the total charging amount and an external charging coefficient.

(13) Ratio of, to Number of Charging Chances (Number of Chances) in State where Vehicle can be externally charged, Number of Times of carrying out External Charging in that State (Number of Times of Charging in Chance) (Number of limes of Charging in Chance/Number of Chances) The number of chances can be obtained by counting the number of times in which the vehicle was parked in a parking lot at home or in a battery charging station in the predetermined time period. Whether or not the vehicle is parked in the parking lot at home or in the battery charging station can be determined by determining whether or not the current position of the vehicle from the navigation device 90 is the parking lot at home or the battery charging station. The number of times of charging can be obtained by counting the number of times in which the vehicle was parked in the parking lot at home or in the battery charging station and charged in the predetermined time period. (14) Inverse Number of Quantity of Fuel Use by Internal Combustion Engine after External Charging (1/Quantity of Fuel Use after External Charging) The quantity of fuel use after external charging can be calculated based on a fuel quantity Qf when the external charging was carried out, a refueled quantity, and a current fuel quantity Qf.

Figure 3:
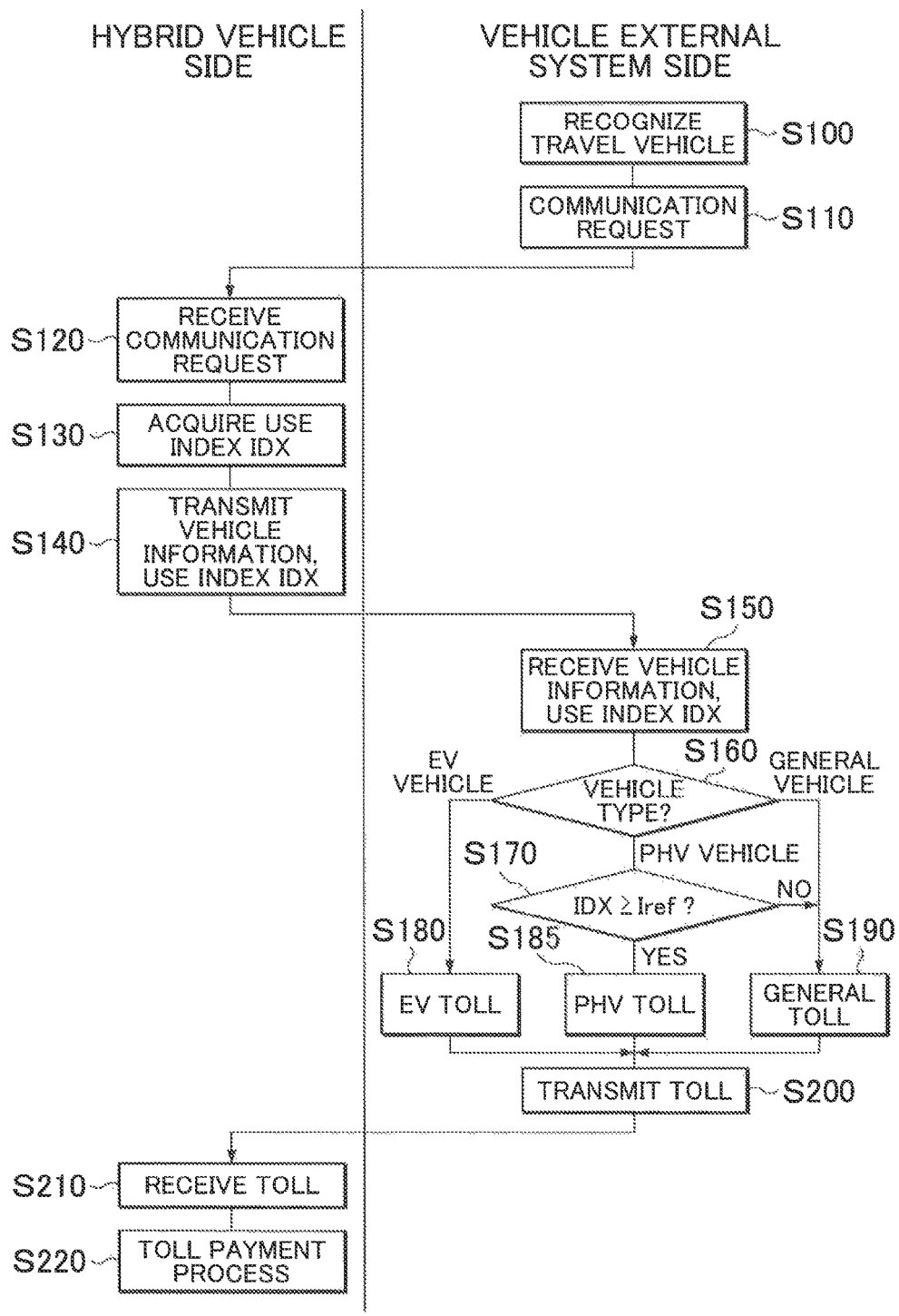
FIG. 3 is an explanatory view illustrating an example of a flow of a communication between a communication device functioning as an in-vehicle ETC on a vehicle side and an vehicle external system functioning as an electronic toll collection system.

Next will be described the operation when the use index IDX is transmitted to the vehicle external system. For simple description, the operation is described with the following concrete example. As the concrete example, an electronic toll collection system (ETC) is employed as the vehicle external system, and its toll categories include the following three categories: an "electric vehicle" treated most preferentially in terms of the toll; a "plug-in hybrid vehicle" treated second most preferentially; and a "general vehicle" that is charged a regular toll. Further, the hybrid vehicle 20 of the embodiment is provided with an in-vehicle ETC, and the in-vehicle ETC also serves as the communication device 94. FIG. 3 is an explanatory view illustrating an example of a flow of the communication between the communication device 94 functioning as the in-vehicle ETC on a vehicle side and the vehicle external system functioning as the electronic toll collection system.

When the hybrid vehicle 20 of the embodiment is to pass an ETC gate, the vehicle external system functioning as the electronic toll collection system recognizes a travel vehicle (step S100) and transmits a communication request to a hybrid-vehicle-20 side (step S110). When the communication device 94 functioning as the in-vehicle ETC receives the communication request from the vehicle external system (step S120), the communication device 94 acquires a use index IDX from the UVECU 70 (step S130) and transmits vehicle information and the use index IDX to a vehicle-external-system side (step S140).

When the vehicle external system receives the vehicle information and the use index IDX (step S150), the vehicle external system determines a vehicle type of the hybrid vehicle 20 based on the vehicle information (step S160). When it is determined that the vehicle type is an electric vehicle (EV vehicle), an application of an EV toll, which is low and treated most preferentially, is set (step S180). When it is determined that the vehicle type is a general vehicle, which is not an electric vehicle (EV vehicle) or a plug-in hybrid vehicle (PHV vehicle), an application of a general toll for the general vehicle, which is not treated preferentially and which is relatively expensive, is set (step S190). When it is determined that the vehicle type is a plug-in hybrid vehicle (PHV vehicle), the use index IDX is compared with a threshold Iref (step S170). Here, the threshold Iref is set in advance as a value at which the degree of use of external charging is considered relatively low. When the use index IDX is the threshold Iref or more, it is determined that the degree of use of external charging is high or relatively high, and an application of a PHV toll, which is an intermediate toll between the EV toll and the general toll, is set (step S185). In the meantime, when the use index IDX is less than the threshold Iref, it is determined that the degree of use of external charging is low or relatively low, and an application of the general toll is set (step S190). When the toll is set as such, the toll thus set is transmitted to the hybrid vehicle 20 (step S200).

When the communication device 94 receives the toll from the vehicle external system (step S210), a payment process for the toll thus received is performed (step S220). The payment process for the toll includes an announcement process of announcing "the toll is XX yen," and the like, and a display process to the display device 92.

The above description deals with the communication of the use index IDX between the communication device 94 functioning as the in-vehicle ETC and the vehicle external system functioning as the electronic toll collection system and the service to be provided and the penalty to be imposed by the vehicle external system based on the use index IDX. The service to be provided or the penalty to be imposed by the vehicle external system based on the use index IDX is not limited to such an electronic toll collection system, but may include, for example, permission of use of a priority lane or a special-purpose lane on a road including a plurality of lanes, permission of entry to a parking lot or the like, permission of use of a priority parking space or a special-purpose parking space in a parking lot, setting of a high battery charging fee or a low battery charging fee at a battery charging station, and so on.

In the hybrid vehicle 20 of the embodiment described above, the use index IDX indicative of the degree of use of external charging is calculated and transmitted to the vehicle external system. The vehicle external system provides a service or imposes a penalty based on the use index IDX. In a case where the degree of use of external charging is determined to be low based on the use index DX, if the vehicle external system provides a non-preferential service or imposes a heavy penalty as compared with a case where the degree of use of external charging is determined to be high, a driver or an owner of the vehicle takes an action by which the use index is determined to indicate a high degree of use of external charging. As a result, the use of external charging can be promoted.

The hybrid vehicle 20 of the embodiment includes the charger 60 configured to charge the battery 50 by connecting the power plug 61 to the external power source 69, but may include a charger that charges the battery 50 by receiving electric power from the external power source 69 in a non-contact manner.

Figure 4:
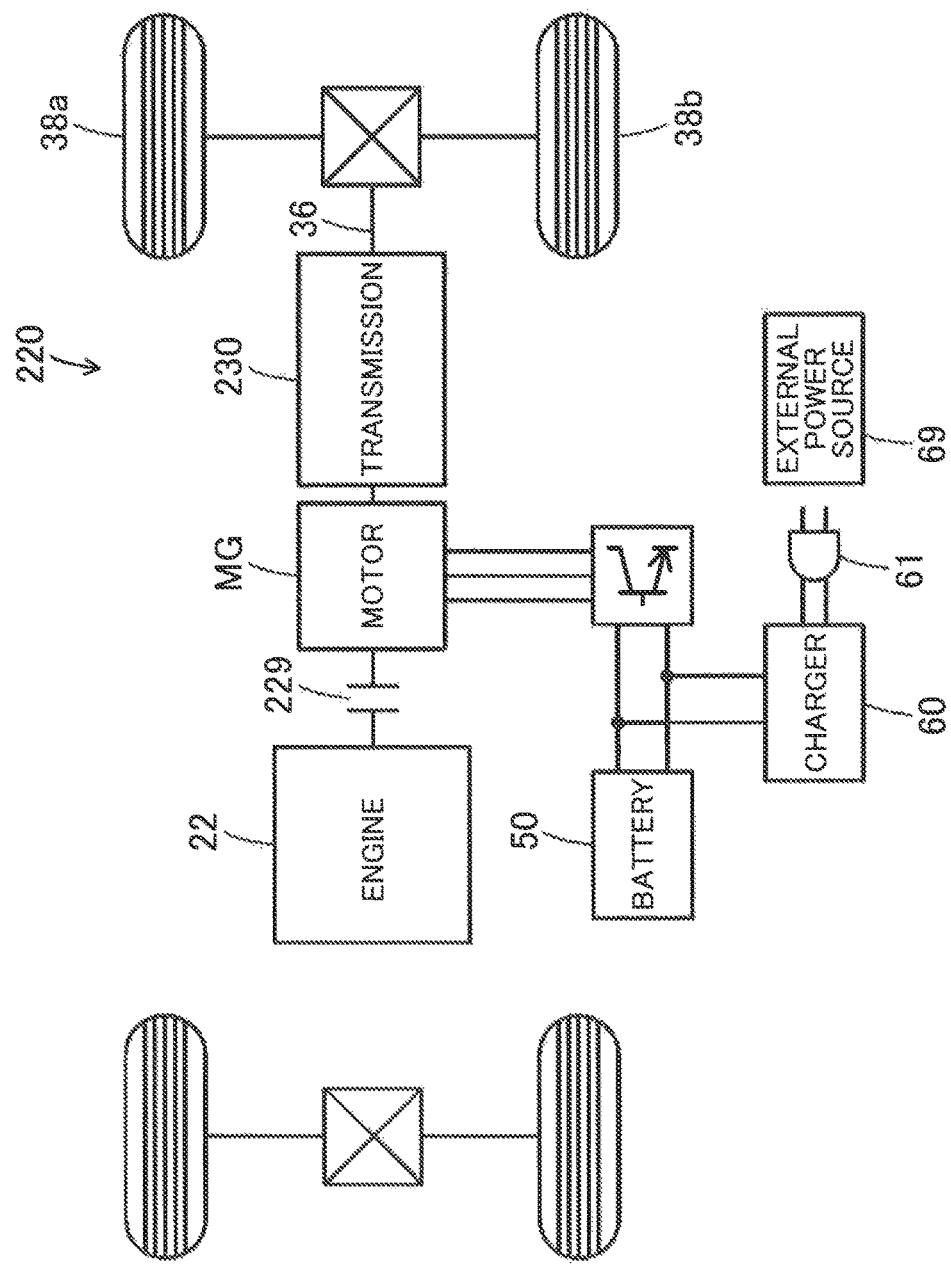
FIG. 4 is a configuration diagram schematically illustrating a configuration of a hybrid vehicle according to a modification.

In the hybrid vehicle 20 of the embodiment, the engine 22, the motor MG1, and the drive shaft 36 are connected to the planetary gear 30 and the motor MG2 is connected to the drive shaft 36. As exemplified in a hybrid vehicle 220 of a modification in FIG. 4, a motor MG may be connected to a drive shaft 36 connected to driving wheels 38a, 38b via a transmission 230, and an engine 22 may be connected to a rotating shaft of the motor MG via a clutch 229, so that power from the engine 22 is output to the drive shaft 36 via the rotating shaft of the motor MG and the transmission 230, and power from the motor MG is output to the drive shaft via the transmission 230. Further, a configuration of what is called a series hybrid vehicle may be employed. That is, any configuration may be employed, provided that the vehicle is a hybrid vehicle including an engine, a motor, a battery, and a charger that charges the battery by being connected to an external power source.

The following describes a correspondence between main elements of the embodiment and main elements of the disclosure described in SUMMARY. In the present embodiment, the engine 22 corresponds to an "engine," the fuel tank 25 corresponds to a "fuel tank," the motor MG2 corresponds to a "motor," the battery 50 corresponds to a "battery," the charger 60 corresponds to a "charger," and the communication device 94 corresponds to a "communication device."

Note that the correspondence between the main elements of the embodiment and the main elements of the disclosure as described in SUMMARY are just examples to specifically describe the mode for carrying out the embodiment, described in SUMMARY, so they are not limited to the elements of the disclosure described in SUMMARY. That is, the interpretation of the disclosure described in SUMMARY should be made based on the description of the field, and the embodiment is merely one concrete example of the embodiment described in SUMMARY.

The configuration to perform the present disclosure has been explained by use of the embodiment, but it is needless to say that the present disclosure is not limited to such an embodiment at all and may be performable in various embodiments as long as the various embodiments are not beyond the gist thereof.

The present disclosure is usable in a manufacture industry of a hybrid vehicle, and the like.

What is claimed is:

1. A hybrid vehicle comprising:
an engine;
a fuel tank configured to supply fuel to the engine;
a motor;
a battery configured to supply electric power to the motor;
a charger configured to carry out external charging that charges the battery by use of an external power source; and
a communication device configured to:
receive a communication request from a vehicle external system, requesting information related to a use index indicative of a degree of use of external charging over a predetermined time period;

acquire the use index from an electronic control unit that calculates the use index;

transmit, to the vehicle external system, the use index in response to the communication request; and receive, from the vehicle external system, information on at least one of a non-preferential service or a penalty in a case where the degree of use of external charging is determined to be lower than in a case where the degree of use of external charging is determined to be higher based on the use index.

2. The hybrid vehicle according to claim 1, further comprising an electronic control unit configured to use any one of the following i) to xiv) as the use index:

i) a ratio of the number of times of charging to the number of trips;

ii) a ratio of a total time for which the charger is connected to the external power source to a total time for which the vehicle is stopped with system off;

iii) a ratio of a total distance of EV travel to a total distance of HV travel;

iv) a ratio of a total time of EV travel to a total time of HV travel;

v) a ratio of the total distance of EV travel to a total travel distance;

vi) a ratio of the total time of EV travel to a total travel time;

vii) a ratio of a total charging amount of charging of the battery by the charger to a total supply quantity to the fuel tank;

viii) a ratio of an integrated value of an energy charged to the battery by electric power from the external power source to an integrated value of an energy consumed by travel;

xi) a ratio of an integrated value of an energy consumed by EV travel to an integrated value of an energy consumed by HV travel;

x) a total time for which the charger is connected to the external power source;

xi) a total charging amount of charging of the battery by the charger;

xii) a ratio of a traveled total travel distance to a total discharge amount of carbon dioxide;

xiii) a ratio of the number of times that the external charging has been carried out in charging chances in which the vehicle is in a state where the external charging is able to be carried out to the number of the charging chances; and xiv) an inverse number of a quantity of fuel used by an internal combustion engine after external charging.

3. The hybrid vehicle according to claim 1, further comprising an electronic control unit configured to calculate the use index based on at least one of the following i) to xiv):

i) a ratio of the number of times of charging to the number of trips;

ii) a ratio of a total time for which the charger is connected to the external power source to a total time for which the vehicle is stopped with system off;

iii) a ratio of a total distance of EV travel to a total distance of HV travel;

iv) a ratio of a total time of EV travel to a total time of HV travel;

v) a ratio of the total distance of EV travel to a total travel distance;

vi) a ratio of the total time of EV travel to a total travel time;

vii) a ratio of a total charging amount of charging of the battery by the charger to a total supply quantity to the fuel tank;

viii) a ratio of an integrated value of an energy charged to the battery by electric power from the external power source to an integrated value of an energy consumed by travel;

ix) a ratio of an integrated value of an energy consumed by EV travel to an integrated value of an energy consumed by HV travel;

x) a total time for which the charger is connected to the external power source;

xi) a total charging amount of charging of the battery by the charger;

xii) a ratio of a traveled total travel distance to a total discharge amount of carbon dioxide;

xiii) a ratio of the number of times that the external charging has been carried out in charging chances in which the vehicle is in a state where the external charging is able to be carried out to the number of the charging chances; and xiv) an inverse number of a quantity of fuel used by an internal combustion engine after external charging.

4. The hybrid vehicle according to claim 1, wherein the information on at least one of the non-preferential service or the penalty includes at least one of permission of use of a priority lane on a road including a plurality of lanes, permission of use of a special-purpose lane on a road including a plurality of lanes, permission of entry to a parking lot, permission of use of a priority parking space in a parking lot, or permission of use of a special-purpose parking space in a parking lot, in response to the use index.

* * * * *